(12) United States Patent
Prunean

(10) Patent No.: US 10,433,267 B2
(45) Date of Patent: Oct. 1, 2019

(54) SATELLITE LINK BUDGET COMMAND INTERFACE TOOL

(71) Applicant: THE BOEING COMPANY, Chicago, IL (US)

(72) Inventor: Cornel Prunean, Chicago, IL (US)

(73) Assignee: The Boeing Company, Chicago, IL (US)

( * ) Notice: Subject to any disclaimer, the term of this patent is extended or adjusted under 35 U.S.C. 154(b) by 981 days.

(21) Appl. No.: 14/924,466

(22) Filed: Oct. 27, 2015

(65) Prior Publication Data
US 2017/0118729 A1    Apr. 27, 2017

(51) Int. Cl.
| | |
|---|---|
| H04W 52/54 | (2009.01) |
| B64G 1/10 | (2006.01) |
| H04B 7/185 | (2006.01) |
| H04W 52/46 | (2009.01) |
| G08C 17/02 | (2006.01) |
| H04W 52/14 | (2009.01) |
| H04B 17/373 | (2015.01) |

(52) U.S. Cl.
CPC .............. *H04W 52/54* (2013.01); *B64G 1/10* (2013.01); *G08C 17/02* (2013.01); *H04B 7/1858* (2013.01); *H04B 7/18515* (2013.01); *H04B 17/373* (2015.01); *H04W 52/146* (2013.01); *H04W 52/46* (2013.01)

(58) Field of Classification Search
CPC ... H04W 52/54; H04W 52/146; H04W 52/46; H04B 17/373; H04B 7/18515; H04B 7/1858; B64G 1/10; G08C 17/02
See application file for complete search history.

(56) References Cited

U.S. PATENT DOCUMENTS

| | | | | |
|---|---|---|---|---|
| 5,918,176 A | * | 6/1999 | Arrington, Jr. .... | H04B 7/18556 455/430 |
| 5,924,015 A | * | 7/1999 | Garrison ............ | H04B 7/18543 455/13.4 |
| 6,188,678 B1 | * | 2/2001 | Prescott .............. | H04W 52/221 370/318 |
| 6,421,528 B1 | * | 7/2002 | Rosen ................ | H04B 7/18513 455/67.16 |

(Continued)

OTHER PUBLICATIONS

P. Garcia, "Satellite Ground System Architecture," Sandia National Laboratories, Nov. 2006 (Year: 2006).*

*Primary Examiner* — Peter D Nolan
(74) *Attorney, Agent, or Firm* — Haynes and Boone LLP

(57) ABSTRACT

Systems, methods, and apparatus for a satellite link budget command interface tool are disclosed. In one or more embodiments, a method for commanding a space vehicle (SV) involves determining a transmitter output power for a control word (CW) at a particular temperature for a transmitter on the SV. Also, the method involves generating a transmitter uplink command by using the transmitter output power. Also, the method involves determining channel power for a mode of operation for at least one code. In addition, the method involves determining attenuated channel power for the mode of operation for the at least one code, where the channel power for the at least one code is attenuated. Additionally, the method involves generating at least one attenuated channel power uplink command by using the attenuated channel power for at least one code.

23 Claims, 16 Drawing Sheets

(56) References Cited

U.S. PATENT DOCUMENTS

| | | | | |
|---|---|---|---|---|
| 7,010,266 B2* | 3/2006 | Hudson | H04B 7/18515 | 455/13.4 |
| 7,532,860 B2* | 5/2009 | Loner | H04B 7/18513 | 342/352 |
| 7,542,829 B2* | 6/2009 | Lee | B64G 1/24 | 244/158.1 |
| 8,077,629 B2* | 12/2011 | Miller | H04B 7/18513 | 370/252 |
| 8,131,212 B2* | 3/2012 | Laufer | H04B 7/18515 | 455/13.4 |
| 8,189,708 B2* | 5/2012 | Benavides | H04L 27/2071 | 329/304 |
| 8,483,888 B2* | 7/2013 | Boileau | H04B 7/18519 | 701/3 |
| 8,639,182 B2* | 1/2014 | Moore, III | H04B 7/18521 | 455/13.2 |
| 8,655,270 B2* | 2/2014 | Laufer | H04B 7/212 | 455/13.4 |
| 9,176,213 B2* | 11/2015 | Liu | G01S 1/042 | |
| 9,178,607 B2* | 11/2015 | Beeler | H04B 7/18519 | |
| 9,374,161 B2* | 6/2016 | Beeler | H04B 7/18519 | |
| 9,549,381 B2* | 1/2017 | Dor | H04W 52/52 | |
| 2002/0113826 A1* | 8/2002 | Chuang | G06F 3/0481 | 715/835 |
| 2002/0168974 A1* | 11/2002 | Rosen | H04B 7/18513 | 455/429 |
| 2002/0177404 A1* | 11/2002 | Hudson | H04B 7/18515 | 455/13.4 |
| 2006/0064726 A1* | 3/2006 | Loner | H04B 7/18513 | 725/68 |
| 2006/0136103 A1* | 6/2006 | Lee | B64G 1/24 | 701/13 |
| 2008/0055151 A1* | 3/2008 | Hudson | H04B 7/18515 | 342/352 |
| 2008/0274690 A1* | 11/2008 | Laufer | H04B 7/18515 | 455/13.4 |
| 2009/0190491 A1* | 7/2009 | Miller | H04B 7/18513 | 370/252 |
| 2010/0034313 A1* | 2/2010 | Benavides | H04L 27/2071 | 375/268 |
| 2011/0021137 A1* | 1/2011 | Laufer | H04B 7/18515 | 455/13.4 |
| 2012/0178363 A1* | 7/2012 | Moore, III | H04B 7/18521 | 455/13.2 |
| 2012/0259485 A1* | 10/2012 | Boileau | H04B 7/18519 | 701/3 |
| 2013/0203407 A1* | 8/2013 | Livergood | H04B 7/18528 | 455/430 |
| 2014/0080408 A1* | 3/2014 | Miller | H04B 7/18513 | 455/12.1 |
| 2014/0160970 A1* | 6/2014 | Beeler | H04B 7/18519 | 370/252 |
| 2014/0233611 A1* | 8/2014 | Beeler | H04B 7/18519 | 375/211 |
| 2014/0266867 A1* | 9/2014 | Liu | G01S 1/042 | 342/200 |
| 2015/0156734 A1* | 6/2015 | Touret | H04B 7/18513 | 370/311 |
| 2015/0215030 A1* | 7/2015 | Moore, III | H04B 7/18521 | 455/428 |
| 2015/0355334 A1* | 12/2015 | Stubbs | G01S 19/02 | 342/357.395 |
| 2016/0050636 A1* | 2/2016 | Dor | H04W 52/52 | 370/311 |
| 2017/0041065 A1* | 2/2017 | Goettle, Jr. | H03F 1/0261 | |

\* cited by examiner

SATELLITE LINK BUDGET COMMAND INTERFACE TOOL

FIELD

The present disclosure relates to a command interface tool. In particular, it relates to a satellite link budget command interface tool.

BACKGROUND

Currently, the Global Positioning System (GPS) IIF satellite L-band transmitters (L1, L2) and synthesizer/interface/modulator/intermediate power amplifier (IPA)/converter (SIMIC) attenuation setting control words (CWs) (i.e. 0 to 47) are limited to predefined modes of operations (i.e. Nom M, Legacy, Alt1 to Alt6) listed in the GPS IIF on-orbit operational handbook (OOH). Currently, for each CW at a specific mode of operation, the L-band transmitter and SIMIC are set to a predefined power level. Being able to set the L-band transmitter and SIMIC to various different specific power levels for each CW at a specific mode of operation will allow the user (e.g., the operator at the satellite ground station) to optimize the use of the GPS IIF space vehicle (SV) constellation to provide desired signal code power levels, thereby improving mission success in less optimal environments. As such, there is a need for a solution to be able to set the L-band transmitters and SIMIC at various different specific power levels for each CW at a specific mode of operation.

SUMMARY

The present disclosure relates to a method, system, and apparatus for a satellite link budget command interface tool. In one or more embodiments, a method for commanding a space vehicle (SV) involves determining, by at least one processor, a transmitter output power for a control word (CW) at a particular temperature for a transmitter on the SV. The method further involves generating, by at least one processor, a transmitter uplink command by using the transmitter output power.

In one or more embodiments, the transmitter and the CW are selected by a user via a user graphical interface (GUI) displayed on a display.

In at least one embodiment, the particular temperature of the transmitter is a temperature prediction based on on-orbit operations.

In one or more embodiments, the method further involves displaying, on a display, the transmitter uplink command.

In at least one embodiment, the transmitter uplink command is a hexadecimal number.

In one or more embodiments, the method further involves transmitting, by at least one antenna, a transmitter uplink command signal comprising the transmitter uplink command to the SV.

In at least one embodiment, the method further involves determining, by at least one processor, channel power for a mode of operation for at least one code. Further, the method involves determining, by at least one processor, attenuated channel power for the mode of operation for at least one code, where the channel power for at least one code is attenuated. Further, the method involves generating, by at least one processor, at least one attenuated channel power uplink command by using the attenuated channel power for at least one code.

In one or more embodiments, the mode of operation and the attenuation for the channel power for at least one code are selected by a user via a user graphical interface (GUI) displayed on a display.

In at least one embodiment, where the attenuation is selected in steps ranging from approximately 1 to 127.

In one or more embodiments, the method further involves displaying, on a display, at least one attenuated channel power uplink command.

In at least one embodiment, each of at least one attenuated channel power uplink command is a hexadecimal number.

In one or more embodiments, the method further involves transmitting, by at least one antenna, at least one attenuated channel power uplink command signal comprising at least one attenuated channel power uplink command to the SV.

In at least one embodiment, the method further comprises displaying, on a display, a constellation plot comprising code power ratios for at least one code.

In one or more embodiments, the method further comprises displaying, on a display, a plot comprising a minimum link performance for each of at least one code.

In at least one embodiment, the method further involves displaying, on a display, a plot comprising a surface antenna pattern for each of at least one code.

In one or more embodiments, the method further involves displaying, on a display, a plot comprising a contour antenna gain pattern for each of at least one code.

In at least one embodiment, the method further involves displaying, on a display, a plot comprising a phi-cut antenna gain pattern for each of at least one code.

In one or more embodiments, a system for commanding a space vehicle (SV) involves at least one processor to determine a transmitter output power for a control word (CW) at a particular temperature for a transmitter on the SV, and to generate a transmitter uplink command by using the transmitter output power.

In at least one embodiment, the system further involves a display to display the transmitter uplink command. In one or more embodiments, the system further involves at least one antenna to transmit a transmitter uplink command signal comprising the transmitter uplink command to the SV.

In one or more embodiments, at least one processor is further to determine channel power for a mode of operation for at least one code; to determine attenuated channel power for the mode of operation for at least one code, where the channel power for at least one code is attenuated; and to generate at least one attenuated channel power uplink command by using the attenuated channel power for at least one code.

In at least one embodiment, the system further involves a display to display at least one attenuated channel power uplink command.

In one or more embodiments, the system further involves at least one antenna to transmit at least one attenuated channel power uplink command signal comprising at least one attenuated channel power uplink command to the SV.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
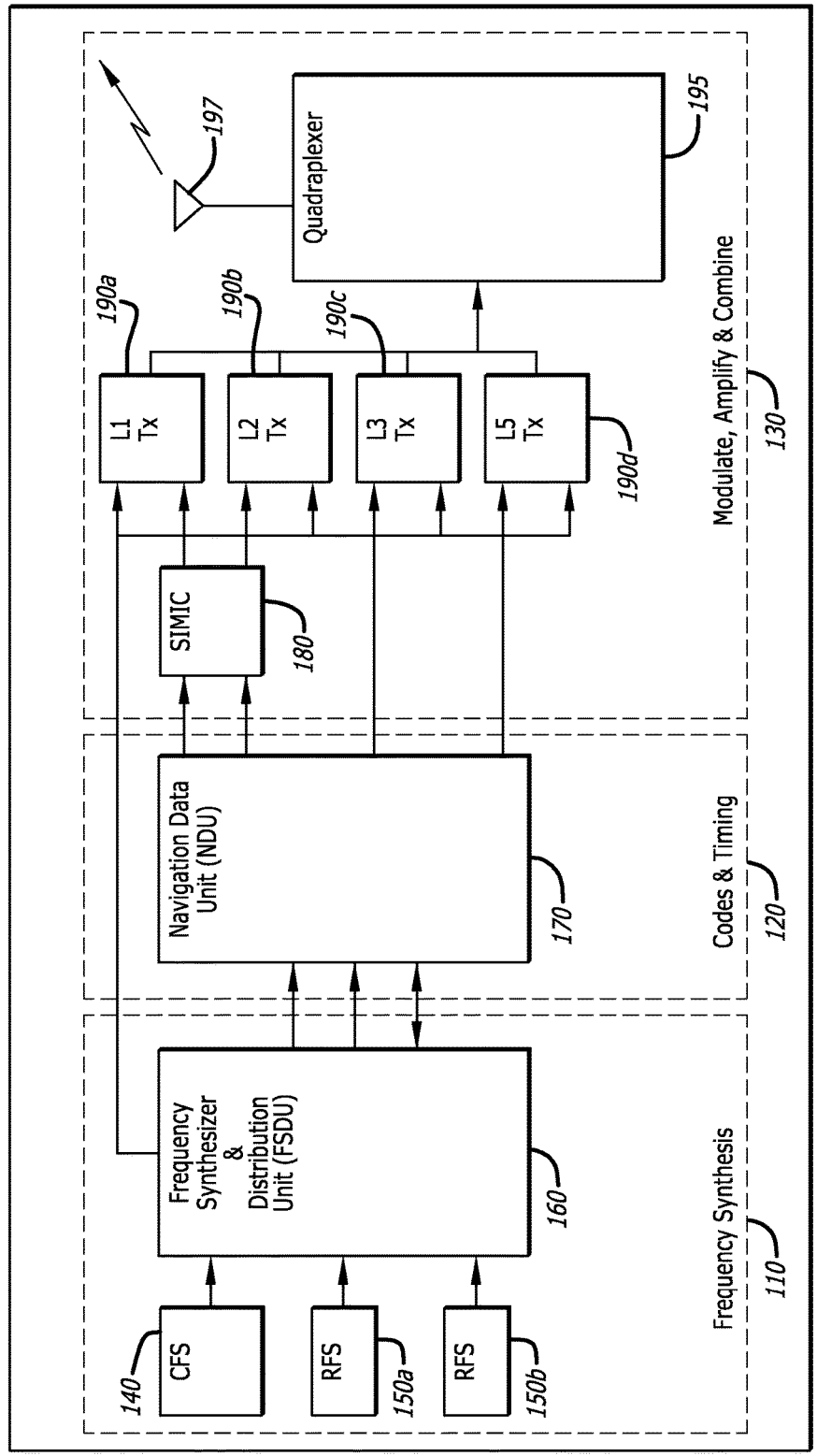
FIG. 1 is a diagram depicting the Global Positioning System (GPS) IIF navigation payload, in accordance with at least one embodiment of the present disclosure.

The methods and apparatus disclosed herein provide an operative system for a satellite link budget command interface tool. The system of the present disclosure teaches an interactive graphical interface that facilitates a user (e.g., an operator at a satellite ground station) to optimize the use of a Global Positioning System (GPS) IIF space vehicle (SV) constellation to provide desired signal code power levels, thereby improving mission success in less optimal environments.

As previously mentioned above, currently, the GPS IIF satellite L-band transmitter and synthesizer/interface/modulator/IPA/converter (SIMIC) attenuation setting control words (CWs) (i.e. 0 to 47) are limited to predefined modes of operations (i.e. Nom M, Legacy, Alt1 to Alt6) listed in the GPS IIF on-orbit operational handbook (OOH). Currently, for each CW at a specific mode of operation, the L-band transmitter and SIMIC are set to a predefined power level. Being able to set the L-band transmitter and SIMIC to various different specific power levels for each CW at a specific mode of operation will allow the user (e.g., the operator at the satellite ground station) to optimize the use of the GPS IIF space vehicle (SV) constellation to provide desired signal code power levels, thereby improving mission success in less optimal environments.

Disclosed is an L-band link budget user interface (UI) tool that will allow the user to optimize desired signal code power output levels via L-band transmitter/SIMIC CWs and calculate the sixteen (16) hexadecimal bit patterns needed for on-orbit GPS SV uplink command formats. The disclosed tool expands the available command flexibility of GPS SV constellations. The disclosed graphical user interface (GUI) has three main sections, which are: (1) a SV specific L1 transmitter section, (2) a SIMIC section, and (3) a plotting section. A user can simply select a CW at a particular temperature, and the tool will calculate the proper configuration and word code for a desired power level and will generate an uplink command. The tool can also calculate when to send a command and at what geographical location and angle of transmission of the command will yield the highest success probability for the command.

It should be noted that although the present disclosure describes a satellite link budget command interface tool specifically directed towards a GPS IIF satellite, the disclosed satellite link budget command interface tool can employed, with some modification, by various different types of satellites and constellations other than a GPS IIF satellite.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to a satellite link budget command interface tool, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Purpose of Tool

The purpose of the disclosed L1/L2 Flex Power Optimization Link Budget user interface (UI) tool (i.e. the satellite link budget command interface tool) is to expand the use of the GPS IIF flex power capability to provide a user with a wider range of signal power levels via L1/L2 transmitters and SIMIC control words (CWs) selection. Current L1/L2 transmitter and SIMIC attenuation settings control words are limited to the pre-defined modes of operations (i.e. Nom M, Legacy, Alt1 to Alt6) listed in the GPS IIF OOH. Setting the L1/L2 transmitters and SIMIC at a specific signal power level via control words will allow the user to optimize the use of GPS IIF SVs Constellation to provide desired signal code power levels, thereby improving mission success in less optimal environments. A L1/L2 link budget user interface (UI) tool (e.g., a MatLab tool) will allow the user to optimize the codes power output levels via L1/L2/SIMIC control words and calculate the sixteen (16) hexadecimal bit patterns needed for SV Uplink Command Formats.

L-Band Link Budget GUI Tool Description

The L-Band link budget user interface is a graphical display in one window containing controls, called components, that enable a user to perform interactive tasks. The user does not have to create a MatLab script or type commands at the command line to accomplish the tasks. Unlike coding programs to accomplish tasks, the user does not need to understand in depth the details of how the tasks are performed. The UI components include menus, toolbars, push buttons, radio buttons, and list boxes that will allow the user to select a specific SV, specific modes and types of operations, read and write data files, and display data as tables or as plots.

Link Budget GUI Tool Methodology and Input Data

The link budget calculation performed by the disclosed GUI tool is described as follows. The L-Band effective isotropic radiated power (EIRP) is calculated as the sum of the following (see EQ. 1 and FIG. 1):

1. Measured output power of the transmitter at specific case predicted operating temperature based on L1/L2/SIMIC ATP vendor data 2. Measured cable losses and modeled mismatch losses between the transmitter and antenna input 3. Measured transmit antenna gains, in dBi $$\text{EIRP}_{[dBW]} = P_{T[dBW]} + G_{T[dBi]} - L_{L[dB]} \qquad \text{EQ. 1}$$

where:

$L_L$=SV losses (i.e., line loss, quadraplexer filter insertion loss, harmonic loss)

$G_T$=SV transmit antenna gain $P_T$=SV transmitter power

The following subsections describe in detail the losses $L_L$, antenna gains $G_T$ and the power of the transmitter $P_L$.

Transmitter Power Output

FIG. 1 is a diagram depicting the GPS IIF navigation payload 100, in accordance with at least one embodiment of the present disclosure. In this figure, the GPS IIF navigation payload block diagram 100 is shown to include a frequency synthesis block 110; a codes and timing block 120; and a modulate, amplify, and combine block 130. The frequency synthesis block is shown to include a cesium frequency standard (CFS) 140, two rubidium frequency standards (RFSs) 150a, b, and a frequency synthesizer and distribution unit (FSDU) 160. The codes and timing block 120 is shown to include a navigation data unit (NDU) 170. The modulate, amplify, and combine block 130 is shown to include a SIMIC 180; four transmitters (L1, L2, L3, L5) 190a, b, c, d; a quadraplexer 195; and an antenna 197.

The GPS IIF navigation payload 100 utilizes a quadrature-phase-key-shift-keying (QPSK) linterplex modulation code combining scheme with the P(Y) and M codes combined in-phase and the C/A and ternary adjustment (T/A) codes combined in-quadrature. The generation and routing to either in-phase or in-quadrature modulators of all four (4) codes is performed by the navigation data unit (NDU) 170.

Figure 2:
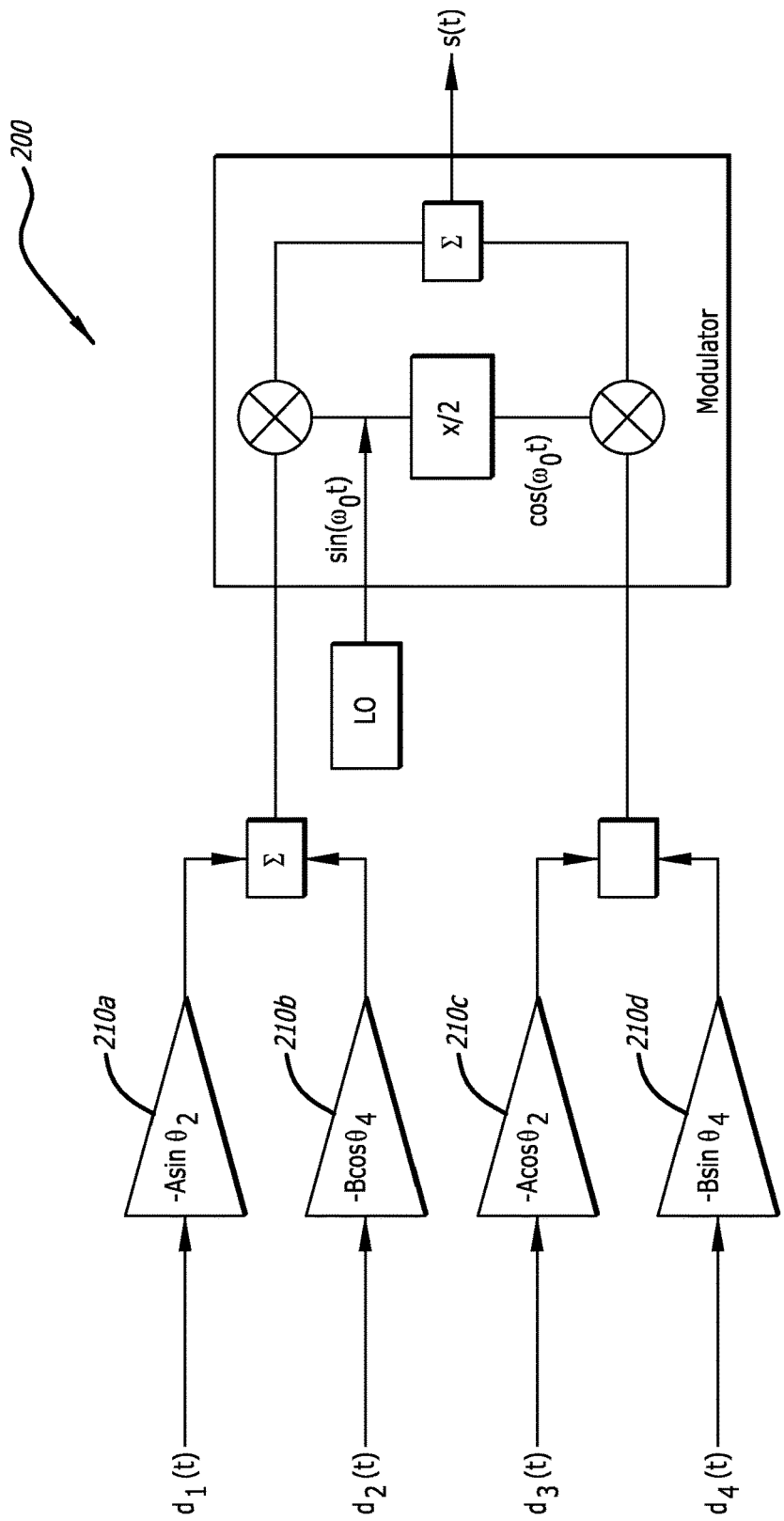
FIG. 2 is a diagram showing the GPS IIF interplex implementation, in accordance with at least one embodiment of the present disclosure.

FIG. 2 is a diagram 200 showing the GPS IIF interplex implementation, in accordance with at least one embodiment of the present disclosure. Since the high power amplifiers (HPAs) 210a, b, c, d, operate under approximately 2 dB of compression, the T/A code is used to balance the power of the P(Y), C/A and M codes as their ratios change, in order to maintain a constant drive level at the input of the HPAs 210a, b, c, d, thereby avoiding non-linearities such as amplitude/phase intermodulation distortion effects. The T/A code (denoted as $d_4$ in FIG. 2) is defined as the XOR Boolean function of the other three digital bit streams (after data modulation), as expressed in equation EQ. 2.

$$T/A = d_1 \oplus d_2 \oplus d_3 \qquad \text{EQ. 2}$$

To maintain a constant drive level into the HPA (i.e. a condition referred to as a "constant envelope"), the power allocated to the T/A is determined by equation EQ. 3 below.

$$P_{T/A} = P_{d1} * P_{d2} / P_{d3} \qquad \text{EQ. 3}$$

where T/A is combined on the same I/Q modulator as that of $d_3$. Since the T/A code is used for power balancing only, it is desirable to allocate to it minimum power.

From the above expression, it can be seen that minimum power is achieved by arranging the signal configuration so that the highest power signal is in the denominator of EQ. 3.

For the tool, vendor measured data for the L1 transmitter output power was used. The L1 transmitter power was measured for 48 CWs (in approximately 0.25 decibel (dB) increments), within a temperature range from −24 to +61 degrees Celsius, and taking into account the harmonic losses.

Harmonic Loss

The harmonic loss, defined as the ratio of the code power in a specific bandwidth to code power in an infinite bandwidth and expressed in decibel (dB), is given by equation EQ. 4 below.

$$(L_h)_{dB} = 10 \text{Log} \left[ \frac{\int_{-BW/2}^{BW/2} S(f) df}{\int_{-\infty}^{\infty} S(f) df} \right] \qquad \text{EQ. 4}$$

This harmonic loss is different for every code and for every carrier frequency, and it is added to the required transmitter power in such a way that the measured code powers are met at end-of-life (EOL). The ratio of the two integrals shown in equation EQ. 4 is defined as the signal containment fraction, and is also expressed as percentage containment.

The M-code used on the GPS IIF navigation payload is a binary offset carrier modulation code (BOC) that uses a data modulated spreading code and a square wave sub-carrier.

A BOC modulation is denoted $BOC_{(fs,fc)}$, where fs is the square-wave sub-carrier frequency, and is defined as $f_s=\frac{1}{2}Ts$, and $f_c$ is the data modulated spreading code rate, $f_c=1/nTs=2/n\, f_s$.

The designation $BOC_{(\alpha,\beta)}$ is used as an abbreviation. The subcarrier frequency is actually $\alpha(1.023)$ Megahertz (MHz), while the spreading code rate is actually $\beta(1.023)$ MHz, where $\alpha$ and $\beta$ are integers. For example, $BOC_{(10,5)}$ means that the subcarrier frequency is 10.23 MHz and the spreading code rate is 5.115 MHz. The power spectral densities of the $BOC_{(\alpha,\beta)}$M-code signal are given below by equation EQ. 5 for n even and EQ. 6 for n odd:

$$G_{BOC(f_s,f_c)}(f) = \frac{1}{nTs}\left(\frac{\sin(\pi fTs)\sin(n\pi fTs)}{\pi f\cos(\pi fTs)}\right)^2, n \text{ even} \quad \text{EQ. 5}$$

$$G_{BOC(f_s,f_c)}(f) = \frac{1}{nTs}\left(\frac{\sin(\pi fTs)\cos(n\pi fTs)}{\pi f\cos(\pi fTs)}\right)^2, n \text{ odd} \quad \text{EQ. 6}$$

The containment fraction value was computed by integrating the theoretical power spectral density (PSD) over the specified quadraplexer bandwidth, divided by the integrated theoretical power spectral density over an infinite bandwidth. The containment fraction was computed using MatLab.

Quadraplexer Filter Insertion Loss

For the tool, actual insertion losses digitized from the measured quadraplexer flight units data (S-parameters) were used. Due to different code chip rates and their corresponding frequency responses, codes are not filtered uniformly as they pass through the quadraplexer. The M-code is filtered more heavily than the P(Y) and C/A codes.

Cable Losses

The cable and connector losses depend on the cable selection, connector selection and cable routing. For the tool, vendor measured cable losses were used.

SV Antenna Gain

For the tool, vendor measured antenna gains were used.

Free Space Loss

The path losses are losses incurred in propagation through space. Space loss ($L_s$) is a decrease in the signal strength, which is a dispersive phenomenon dependent on distance and wavelength (see EQ. 7).

$$L_s = \left(\frac{4\pi d}{\lambda}\right)^2 \quad \text{EQ. 7}$$

where:

d = Satellite to receiver distance

λ = Wavelength

The free space loss, being frequency dependent, will be slightly different for each signal band. Satellite to receiver distance, d, is calculated referenced to the user receiving antenna (located near ground) at worst normal orientation, when the SV is above a 5-degree elevation angle, and the L1 signal free space loss is 184.4 dB.

Atmospheric Loss

The Earth's ionosphere is a partially ionized gas or plasma, which is rendered anisotropic by the presence of the Earth's magnetic field, and its effective relative permittivity can be mathematically modeled as a slow time-varying tensor (e.g., a 3×3 matrix with complex elements). For the tool, a fixed value for atmospheric loss of 0.5 dB was assumed.

Receiver Antenna Gain

The gain of the user's antenna must be accounted for in computing the total received signal level. Although this gain will typically vary from user to user, the interface control documents have standardized this value. GPS IIF system requirements specify that the user receiving antenna is linear with +3 dB gain. An antenna receiving a circularly polarized signal will typically receive 3 dB less total power than an equivalent linearly polarized signal.

Required Power Levels

The required L1 signal strength at edge-of-earth (EOE) for vehicles SV01 to SV 12 were used for the tool.

Computed Power Levels

The user received signal level is computed by:

$$RSL = EIRP - L_s - L_a + G_r. \quad \text{EQ. 8}$$

where:

EIRP=SV Effective Isotropic Radiated Power $L_s$=Free Space Loss $L_a$=Other Path Losses (i.e., atmospheric loss)

$G_r$=Receiver antenna gain

Using Equation EQ. 8 and the values given in the previous sections, the received signal level can be computed for all codes modes of operation (i.e., Nom M, Legacy, Alt1 to Alt6).

L1/L2 Link Budget UI Graphical Tool

Figure 3:
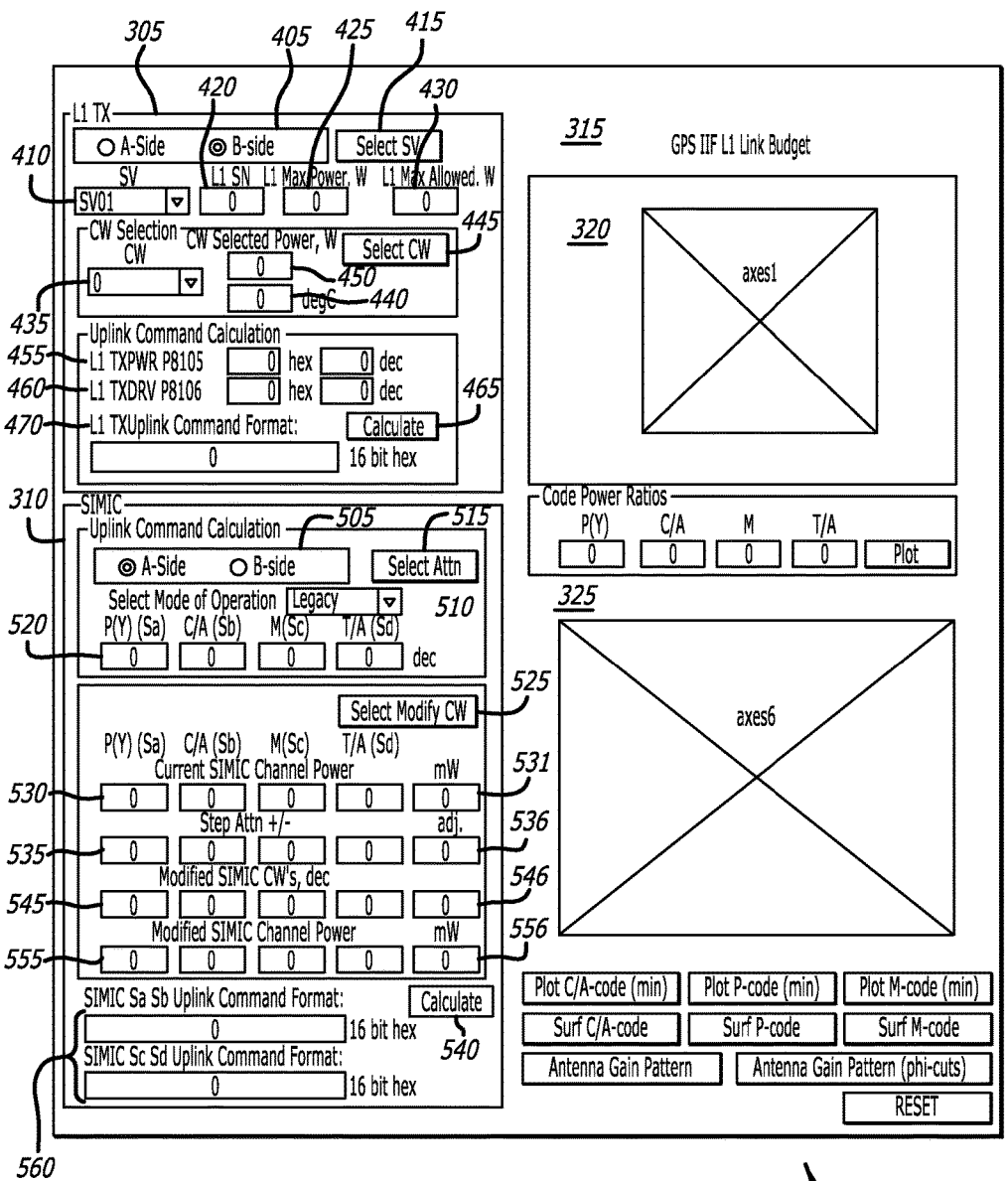
FIG. 3 is a diagram illustrating a graphical user interface (GUI) for the disclosed system for commanding a space vehicle (SV), in accordance with at least one embodiment of the present disclosure.

FIG. 3 is a diagram illustrating a graphical user interface (GUI) 300 for the disclosed system for commanding a space vehicle (SV), in accordance with at least one embodiment of the present disclosure. The GUI 300 can derive new attenuation settings, which will allow the user to optimize the codes power output levels via L1/L2/SIMIC control words and calculate the 16 hexadecimal bit patterns needed for SV uplink command formats. The GUI 300 has three main sections: one for SV specific L1 transmitters selection (i.e. the L1 transmitter control word (CW) selection block 305), one for SIMIC selection (i.e. the SIMIC CW selection block 310), and one for plotting (i.e. the plotting block 315, which comprises an upper plotting block 320 and a lower plotting block 325). The particulars of each of these three sections will be discussed in detail below.

L1 Control Word Selection

Figure 4:
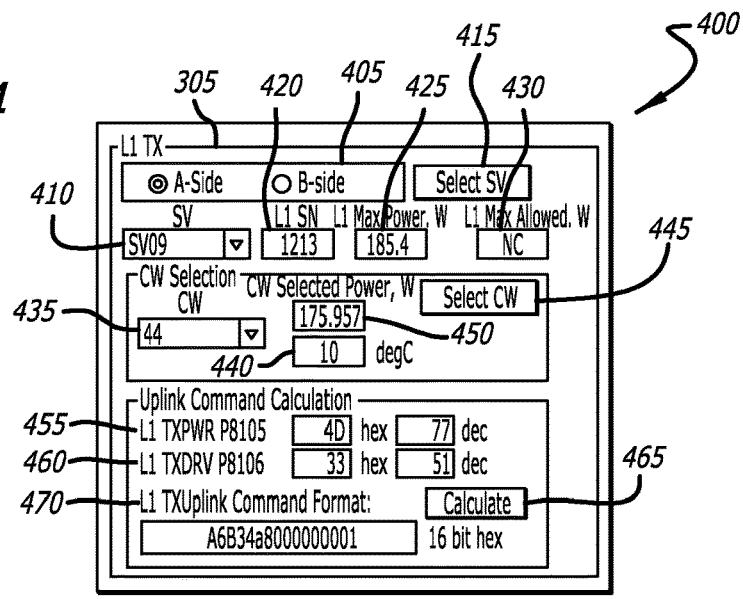
FIG. 4 is a diagram showing the L1 transmitter control word (CW) selection block of the GUI of FIG. 3, in accordance with at least one embodiment of the present disclosure.

FIG. 4 is a diagram 400 showing the L1 transmitter CW selection block 305 of the GUI 300 of FIG. 3, in accordance with at least one embodiment of the present disclosure. The L1 transmitter CW selection block 305 comprises drop-menus and buttons.

During operation, a user chooses a side of the SV by selecting either the A-side or B-side in the SV side selection box 405. The user also selects the particular SV by using a drop-down menu in the SV selection box 410.

The user then presses the "Select SV" button 415. After the "Select SV" button 415 is depressed, at least one processor (not shown) will determine and the GUI 300 will display (1) the corresponding L1 transmitter serial number (SN) 420, (2) the maximum total radio frequency (RF) power 425 that the specific transmitter can output in Watts (W), and also (3) a maximum allowed power (W) constraint 430 for the specific transmitter, if such as constraint exists for the specific transmitter unit.

Then, the user selects the particular control word (from 0 to 47) by using a drop-down menu in the CW selection box 435. The user then inputs the predicted operational temperature (in degrees Celsius) for the specific transmitter unit into the temperature box 440. The predicted operational temperature is a prediction of temperature for that particular transmitter unit that is based on information from on-orbit operations of that particular transmitter unit.

Then, the user presses the "Select CW" button 445. After the "Select CW" button 445 is depressed, at least one processor will determine and the GUI 300 will display (1) the output power 450 in W for the particular transmitter unit for the selected CW at the specified predicted operational temperature, (2) the corresponding amplifier CW (i.e. L1 TXPWR P8105) 455 in hexadecimal (hex) and decimal (dec) formats, and (3) the corresponding transmitter driver CW (i.e. L1 TXDRV P8106) 460 in hexadecimal and decimal formats.

The user then presses the "Calculate" button 465. After the "Calculate" button 465 is depressed, at least one processor will generate and the GUI 300 will display the corresponding transmitter uplink command (i.e. L1 TX Uplink Command Format) 470, which is a sixteen (16) bit hexadecimal (16 bit hex) number. Then, at least one antenna (not shown) transmits a transmitter uplink command signal comprising the transmitter uplink command 470 to the selected SV.

FIG. 4 illustrates a particular example. In this example, the A-side is selected using the SV side selection box 405, and SV nine (i.e. SV09) is selected by using the drop-down menu in the SV selection box 410. After the "Select SV" button 415 is depressed, at least one processor will determine and the GUI 300 will display (1) the corresponding L1 transmitter serial number (SN) 420 to be 1213, (2) the maximum total radio frequency (RF) power 425 that the specific transmitter can output to be 185.4 W, and (3) that there is no maximum allowed power (W) constraint 430 for the specific transmitter (i.e. no constraint (NC)).

Also in this example, CW 44 is selected by using the drop-down menu in the CW selection box 435, and the predicted operational temperature of 10 degrees Celsius for the specific transmitter (i.e. the transmitter unit with SN 1213) is inputted into the temperature box 440. After the "Select CW" button 445 is depressed, at least one processor will determine and the GUI 300 will display (1) the output power 450 of 175.957 W for the particular transmitter unit (i.e. the transmitter unit with SN 1213) for the selected CW (i.e. 44) at the specified predicted operational temperature (10 degrees Celsius), (2) the corresponding amplifier CW (i.e. L1 TXPWR P8105) 455 of 4D in hex and 77 in dec, and (3) the corresponding transmitter driver CW (i.e. L1 TXDRV P8106) 460 of 33 in hex and 51 in dec.

After the "Calculate" button 465 is depressed, at least one processor will generate and the GUI 300 will display the corresponding transmitter uplink command (i.e. L1 TX Uplink Command Format) 470 of A6B34a8000000001 in hex. Then, at least one antenna (not shown) transmits a transmitter uplink command signal comprising the transmitter uplink command 470 (i.e. A6B34a8000000001) to the selected SV (i.e. SV09).

SIMIC Control Word Selection

Figure 5:
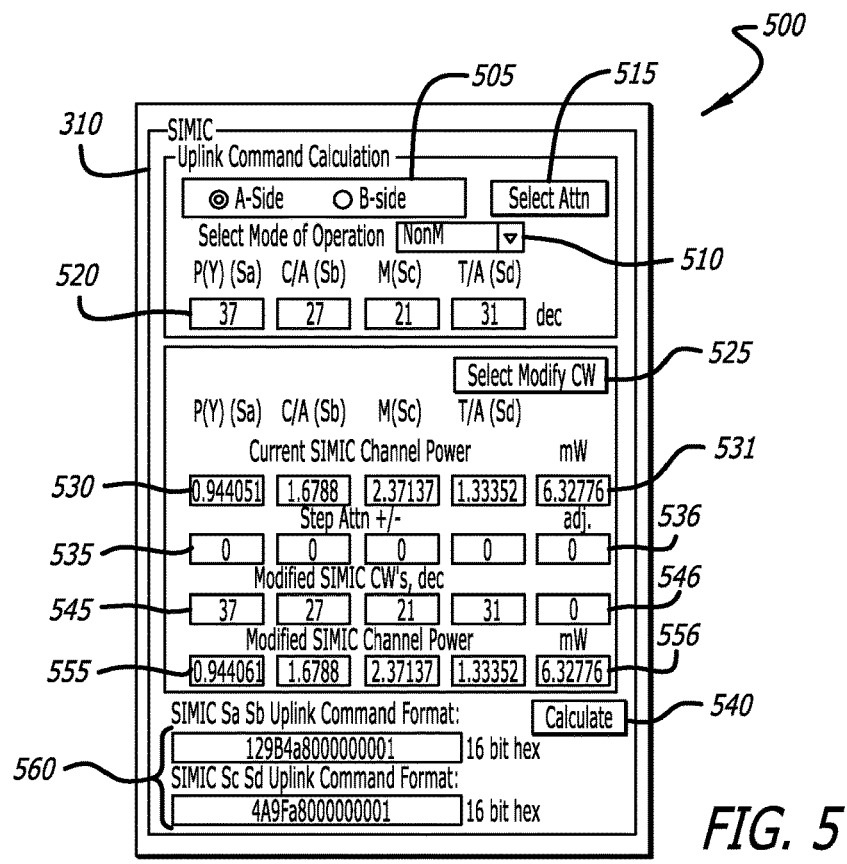
FIG. 5 is a diagram depicting the SIMIC CW selection block of the GUI of FIG. 3, in accordance with at least one embodiment of the present disclosure.

FIG. 5 is a diagram 500 depicting the SIMIC CW selection block 310 of the GUI 300 of FIG. 3, in accordance with at least one embodiment of the present disclosure. The SIMIC CW selection block 310 comprises drop-menus and buttons.

During operation, a user chooses a side of the SV by selecting either the A-side or B-side in the SIMIC SV side selection box 505. The user also selects the particular mode of operation (i.e. Legacy, Nom-M, and Alt1 to Alt6) by using a drop-down menu in the Select Mode of Operation box 510.

The user then presses the "Select Attn" button 515. After the "Select Attn" button 515 is depressed, at least one processor (not shown) will determine and the GUI 300 will display the CWs 520 for each code (i.e. P(Y) {Sa}, C/A {Sb}, M {Sc}, and T/A {Sd}) in decimal (dec) format for the selected mode of operation.

Then, the user presses the "Select/Modify CW" button 525. After the "Select/Modify CW" button 525 is depressed, at least one processor will determine and the GUI 300 will display the current SIMIC channel power 530 in milliwatts (mW) for each code along with the total SIMIC channel power 531 in mW.

If the user desires to change the attenuation settings for any of the SIMIC channel powers for any of the codes, the user will type in a desired amount of attenuation (i.e. either a positive amount or negative amount of attenuation, e.g., from 1 to 127) in the specific "Step Attn +/−" box 535 for the particular code.

The user then presses the "Calculate" button 540. After the "Calculate" button 540 is depressed, at least one processor will generate and the GUI 300 will display (1) the total amount of attenuation adjustment (adj.) 536, the modified CWs 545 for each code in decimal (dec) format along with the total amount in dec format in the CWs that was modified 546, (3) the modified SIMIC channel power 555 in mW for each code along with the total modified SIMIC channel power 556 in mW, (4) at least one corresponding attenuated channel power uplink command (i.e. the SIMIC SaSb Uplink Command (for attenuators Sa and Sb) and/or the SIMIC ScSd Uplink Command (for attenuators Sc and Sd)) 560, which are each a sixteen (16) bit hexadecimal (16 bit hex) number. Then, at least one antenna (not shown) transmits at least one attenuated channel power uplink command signal comprising at least one attenuated channel power uplink command 560 to the selected SV.

FIG. 5 illustrates a particular example. In this example, the A-side is selected using the SIMIC SV side selection box 505, and the NomM mode of operation is selected by using the drop-down menu in the Select Mode of Operation box 510. Also, it should be noted that SV nine (i.e. SV09) was selected by using the drop-down menu in the SV selection box 410 (refer to FIG. 4).

After the "Select Attn" button 515 is depressed, at least one processor (not shown) will determine and the GUI 300 will display the CWs 520 for each code (e.g., 37 for P(Y) {Sa}, 27 for C/A {Sb}, 21 for M {Sc}, and 31 for T/A {Sd}) in decimal (dec) format for the selected mode of operation.

After the "Select/Modify CW" button 525 is depressed, at least one processor will determine and the GUI 300 will display the current SIMIC channel power 530 in milliwatts (mW) for each code (i.e. 0.944061 for P(Y) {Sa}, 1.6788 for C/A {Sb}, 2.37137 for M {Sc}, 1.33352 for T/A {Sd}) along with the total SIMIC channel power 531 of 6.32776 mW.

In this example, the user did not desire to change any of the attenuation settings and, as such, zero (0) is inputted as the desired amount of attenuation for the specific "Step Attn +/−" box 535 for each of the codes.

After the "Calculate" button 540 is depressed, at least one processor will generate and the GUI 300 will display (1) the total amount of attenuation adjustment (adj.) 536 of 0, the modified CWs 545 for each code (i.e. 37 for P(Y) {Sa}, 27 for C/A {Sb}, 21 for M {Sc}, and 31 for T/A {Sd}) along in decimal (dec) format along with the total amount of 0 in dec format in the CWs that was modified 546, (3) the modified SIMIC channel power 555 in mW for each code (i.e. 0.944061 for P(Y) {Sa}, 1.6788 for C/A {Sb}, 2.37137 for M {Sc}, 1.33352 for T/A {Sd}) with the total modified SIMIC channel power 556 of 6.32776 mW, (4) at least one corresponding attenuated channel power uplink command (i.e. the SIMIC SaSb Uplink Command (for attenuators Sa and Sb) (i.e. 129B4a8000000001) and/or the SIMIC ScSd Uplink Command (for attenuators Sc and Sd) (i.e. 4A9F4a8000000001)) 560, which are each a sixteen (16) bit hexadecimal (16 bit hex) number. Then, at least one antenna (not shown) transmits at least one attenuated channel power uplink command signal comprising at least one attenuated channel power uplink command 560 to the selected SV (i.e. SV09).

Code Power Ratios and Signal Ideal Constellation

Figure 6:
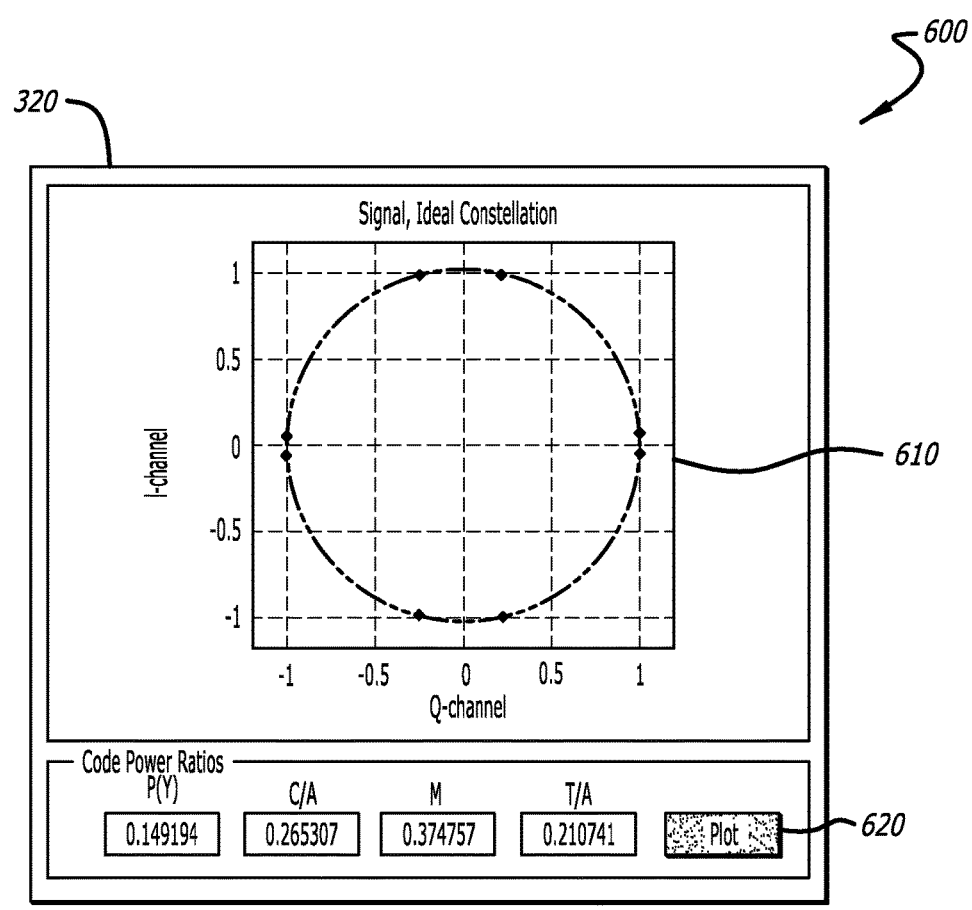
FIG. 6 is a diagram illustrating a constellation plot comprising code power ratios for the codes on the plotting block of the GUI of FIG. 3, in accordance with at least one embodiment of the present disclosure.

FIG. 6 is a diagram 600 illustrating a constellation plot 610 comprising code power ratios for the codes (i.e. P(Y), C/A, M, and T/A) on the plotting block 315 of the GUI 300 of FIG. 3, in accordance with at least one embodiment of the present disclosure. In particular, the diagram 600 depicts the upper plotting block 320 of the plotting block 315 of the GUI 300 of FIG. 3. For the constellation plot 610, the Q-channel is on the x-axis and the I-channel is on the y-axis. When a user desires to plot a constellation plot 610 on the GUI 300, the user depresses the "Plot" button 620 of the upper plotting block 320 and the constellation plot 610 will be displayed in the upper plotting block 320 on the GUI 300.

During operation, the L1 transmitters operate under approximately 2 decibels (dB) of compression and, as such, the T/A code is used to balance the power levels of the P(Y), C/A, and M codes as their ratios change, in order to maintain a constant drive level at the input of the high power amplifiers (HPAs), thereby avoiding distortion effects. The constellation plot 610 allows for observing a constant envelope of transmission by keeping the constellation points on the unit circle (i.e. an ideal constellation), or within very close vicinity to the unit circle within an allowable degree of deformation allowed by system requirements.

L1 Link Budget

The GUI 300 (refer to FIG. 3) can display plots illustrating the minimum link performance in decibel-Watts (dBW) for each code (i.e. P(Y), C/A, M, and T/A) for the angles off-boresight from 0 to 14.3 degrees (deg), using the worst case scenario of losses and antenna gains.

Figure 7:
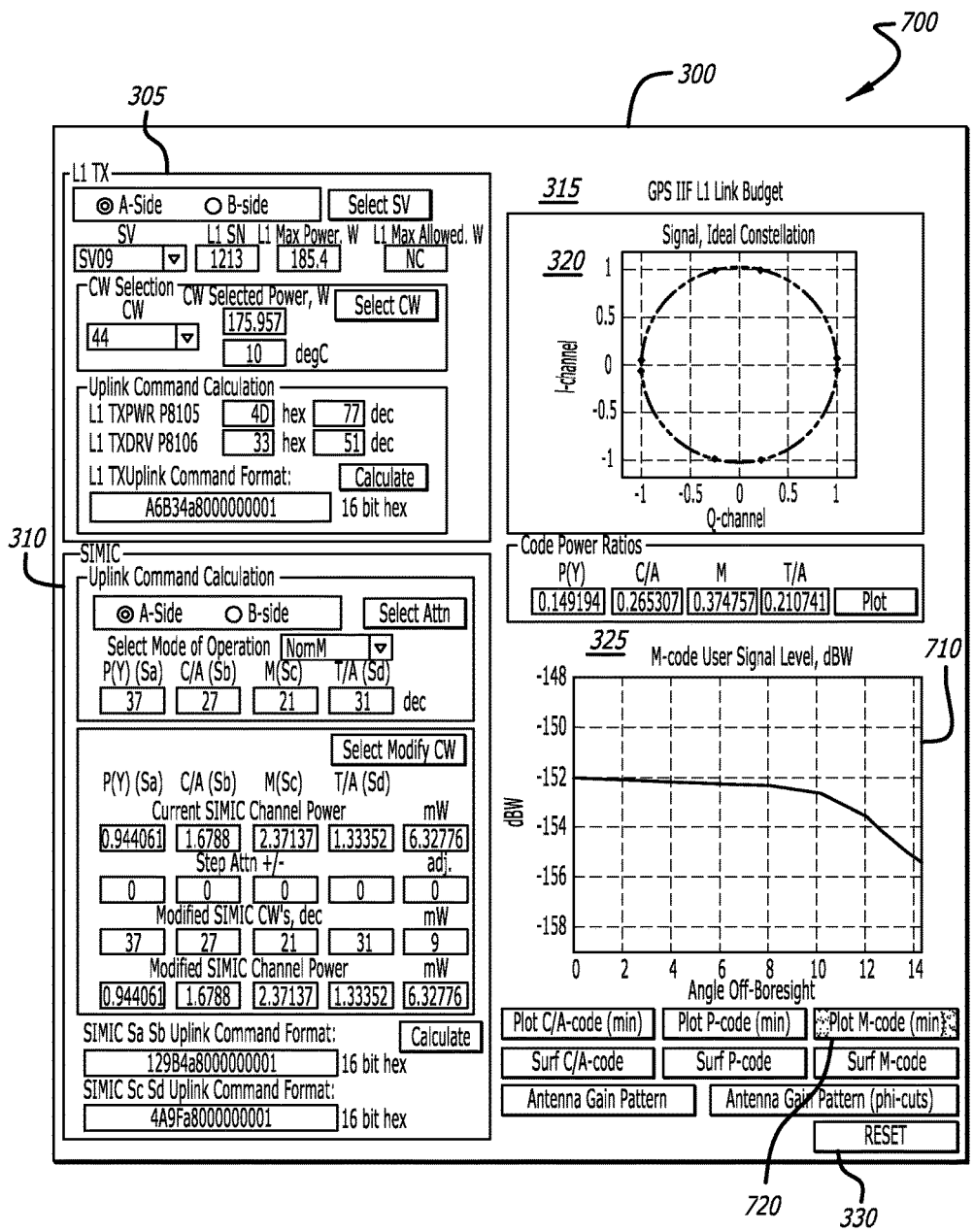
FIG. 7 is a diagram showing a plot showing the minimum link performance for the M-code on the plotting block of the GUI of FIG. 3, in accordance with at least one embodiment of the present disclosure.

FIG. 7 is a diagram 700 showing a plot 710 showing the minimum link performance for the M-code on the plotting block 315 of the GUI 300 of FIG. 3, in accordance with at least one embodiment of the present disclosure. In particular, the diagram 700 depicts the plot 710 in the lower plotting block 325 of the plotting block 315 of the GUI 300 of FIG. 3. For the plot 710, the angle off-boresight in deg is on the x-axis and the M-code user signal level in dBW is on the y-axis. When the user desires to plot the minimum link performance for the M-code on the lower plotting block 325 of the GUI 300, the user depresses the "Plot M-code (min)" button 720 button of the lower plotting block 325 and the plot 710 will be displayed in the lower plotting block 325 on the GUI 300.

It should be noted that when a user desires to reset the lower plotting block 325 on the GUI 300, the user depresses the "RESET" button 330. After the "RESET" button 330 is depressed, the lower plotting block 325 will be reset to no longer display a plot.

Figure 8:
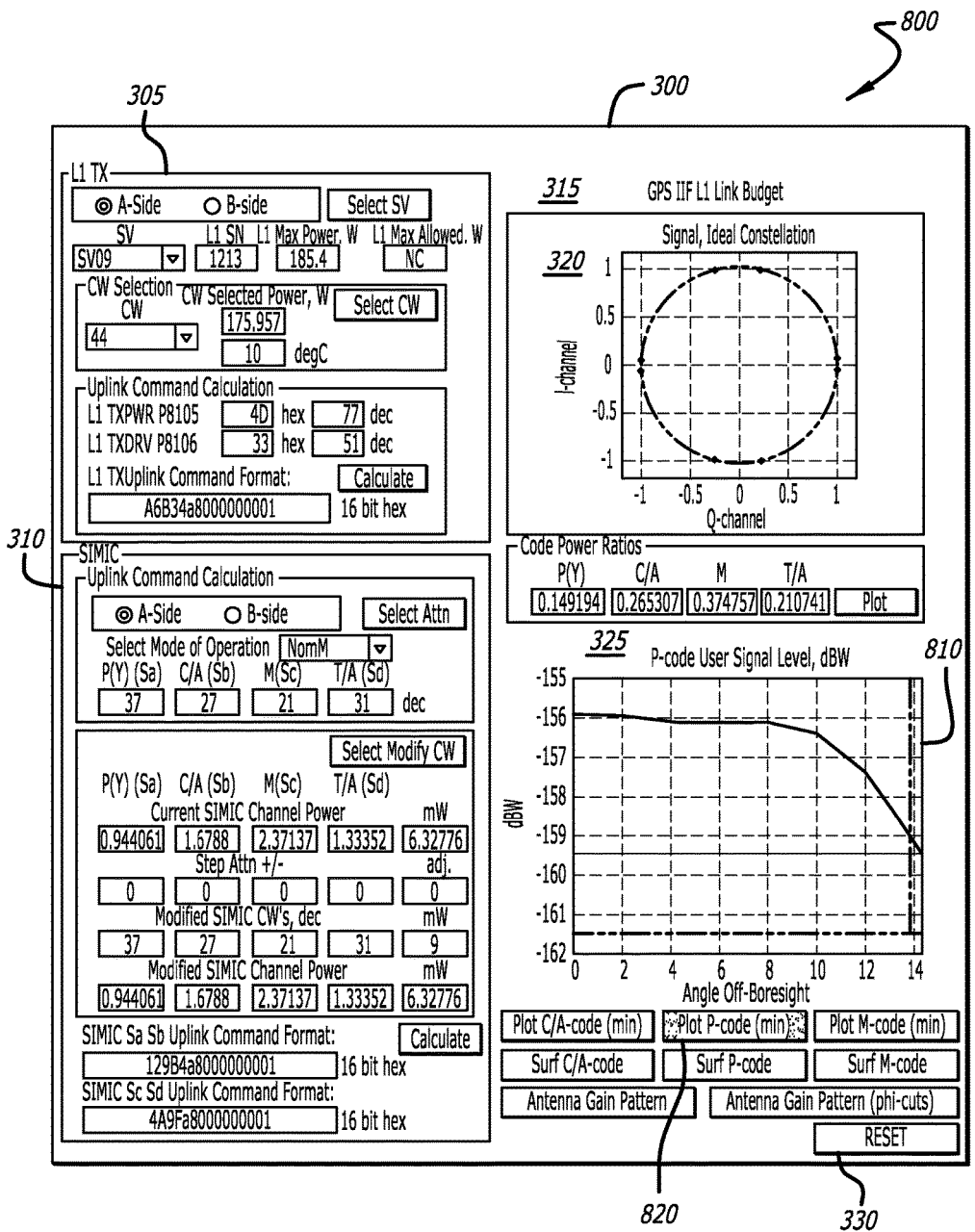
FIG. 8 is a diagram depicting a plot showing the minimum link performance for the P-code on the plotting block of the GUI of FIG. 3, in accordance with at least one embodiment of the present disclosure.

FIG. 8 is a diagram 800 depicting a plot 810 showing the minimum link performance for the P-code on the plotting block 315 of the GUI 300 of FIG. 3, in accordance with at least one embodiment of the present disclosure. In particular, the diagram 800 depicts the plot 810 in the lower plotting block 325 of the plotting block 315 of the GUI 300 of FIG. 3. For the plot 810, the angle off-boresight in deg is on the x-axis and the P-code user signal level in dBW is on the y-axis. When the user desires to plot the minimum link performance for the P-code on the lower plotting block 325 of the GUI 300, the user depresses the "Plot P-code (min)" button 820 button of the lower plotting block 325 and the plot 810 will be displayed in the lower plotting block 325 on the GUI 300.

Figure 9:
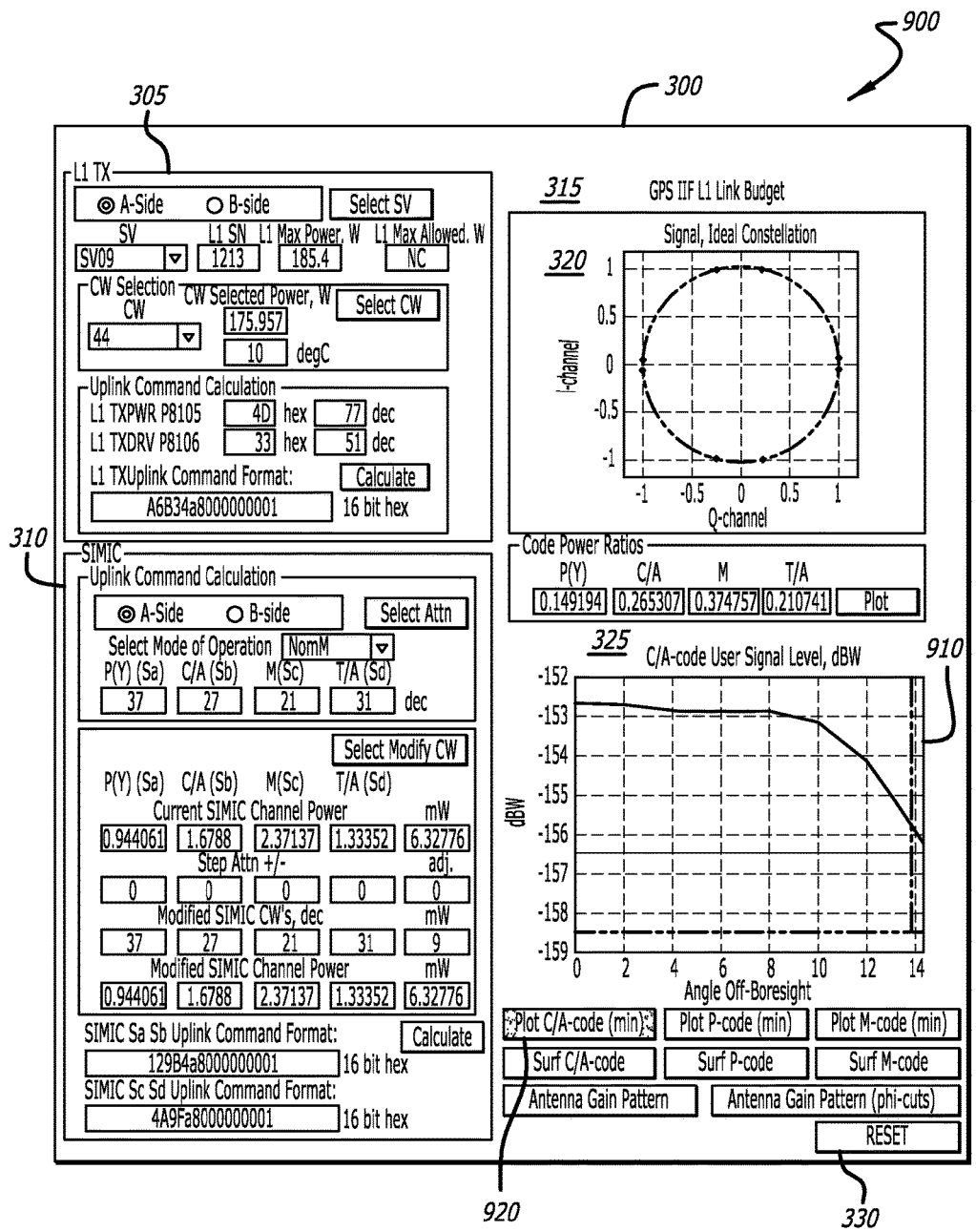
FIG. 9 is a diagram illustrating a plot showing the minimum link performance for the C/A code on the plotting block of the GUI of FIG. 3, in accordance with at least one embodiment of the present disclosure.

FIG. 9 is a diagram 900 illustrating a plot 910 showing the minimum link performance for the C/A code on the plotting block 315 of the GUI 300 of FIG. 3, in accordance with at least one embodiment of the present disclosure. In particular, the diagram 900 depicts the plot 910 in the lower plotting block 325 of the plotting block 315 of the GUI 300 of FIG. 3. For the plot 910, the angle off-boresight in deg is on the x-axis and the C/A-code user signal level in dBW is on the y-axis. When the user desires to plot the minimum link performance for the C/A-code on the lower plotting block 325 of the GUI 300, the user depresses the "Plot C/A-code (min)" button 920 button of the lower plotting block 325 and the plot 910 will be displayed in the lower plotting block 325 on the GUI 300.

The GUI 300 (refer to FIG. 3) can display three-dimensional surface (3D) plots for each code (i.e. P(Y), C/A, M, and T/A) using the phi-cut measured antenna angles.

Figure 10:
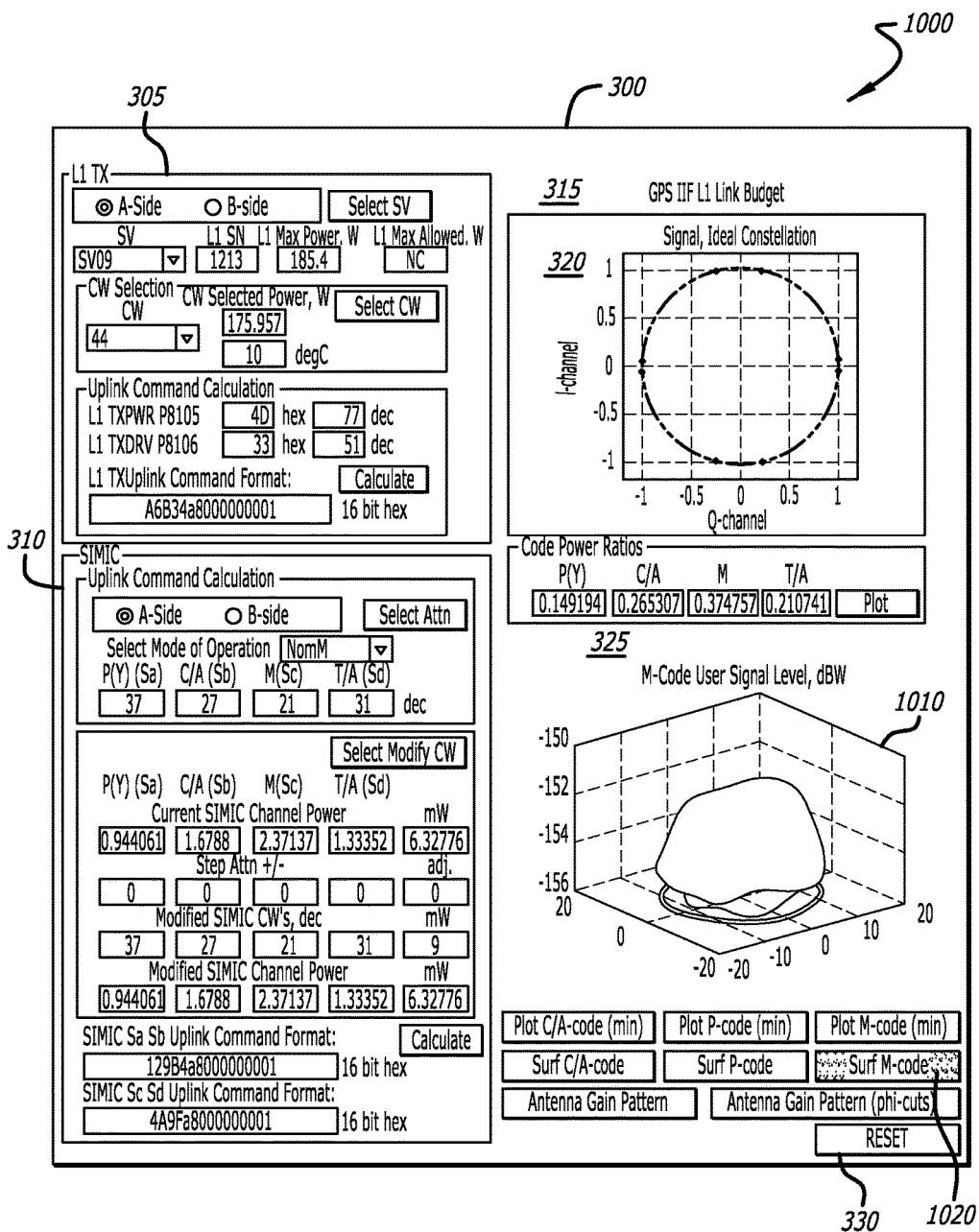
FIG. 10 is a diagram depicting a plot showing the surface antenna pattern for the M-code on the plotting block of the GUI of FIG. 3, in accordance with at least one embodiment of the present disclosure.

FIG. 10 is a diagram 1000 depicting a plot 1010 showing the surface antenna pattern for the M-code on the plotting block 315 of the GUI 300 of FIG. 3, in accordance with at least one embodiment of the present disclosure. In particular, the diagram 1000 depicts the plot 1010 in the lower plotting block 325 of the plotting block 315 of the GUI 300 of FIG. 3. For the plot 1010, the phi-cut measured antenna angles in deg are on the x-axis and the y-axis, and the M-code user signal level in dBW is on the z-axis. When the user desires to plot the surface antenna pattern for the M-code on the lower plotting block 325 of the GUI 300, the user depresses the "Surf M-code" button 1020 button of the lower plotting block 325 and the plot 1010 will be displayed in the lower plotting block 325 on the GUI 300.

Figure 11:
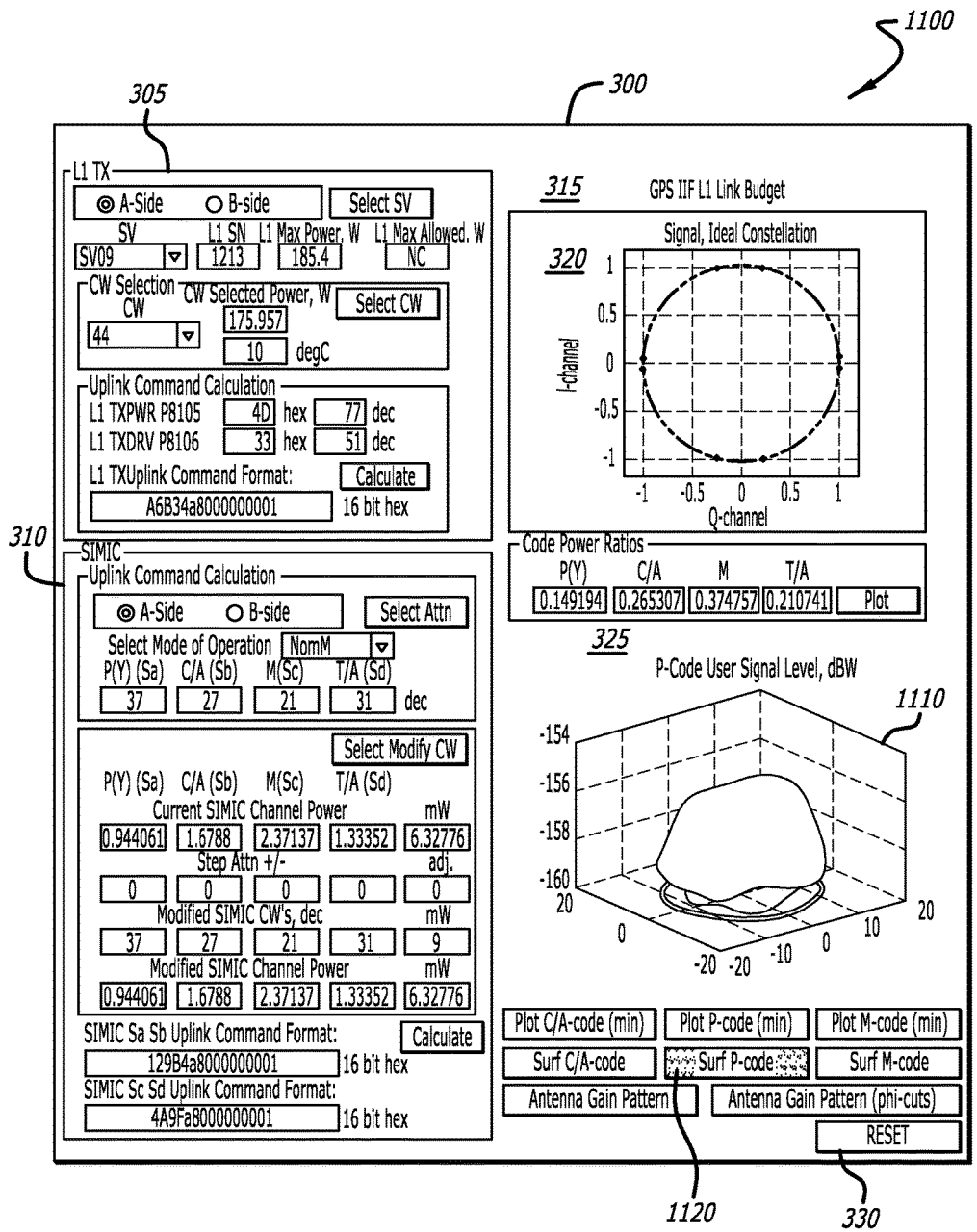
FIG. 11 is a diagram showing a plot showing the surface antenna pattern for the P-code on the plotting block of the GUI of FIG. 3, in accordance with at least one embodiment of the present disclosure.

FIG. 11 is a diagram 1100 showing a plot 1110 showing the surface antenna pattern for the P-code on the plotting block 315 of the GUI 300 of FIG. 3, in accordance with at least one embodiment of the present disclosure. In particular, the diagram 1100 depicts the plot 1110 in the lower plotting block 325 of the plotting block 315 of the GUI 300 of FIG. 3. For the plot 1110, the phi-cut measured antenna angles in deg are on the x-axis and the y-axis, and the P-code user signal level in dBW is on the z-axis. When the user desires to plot the surface antenna pattern for the P-code on the lower plotting block 325 of the GUI 300, the user depresses the "Surf P-code" button 1120 button of the lower plotting block 325 and the plot 1110 will be displayed in the lower plotting block 325 on the GUI 300.

Figure 12:
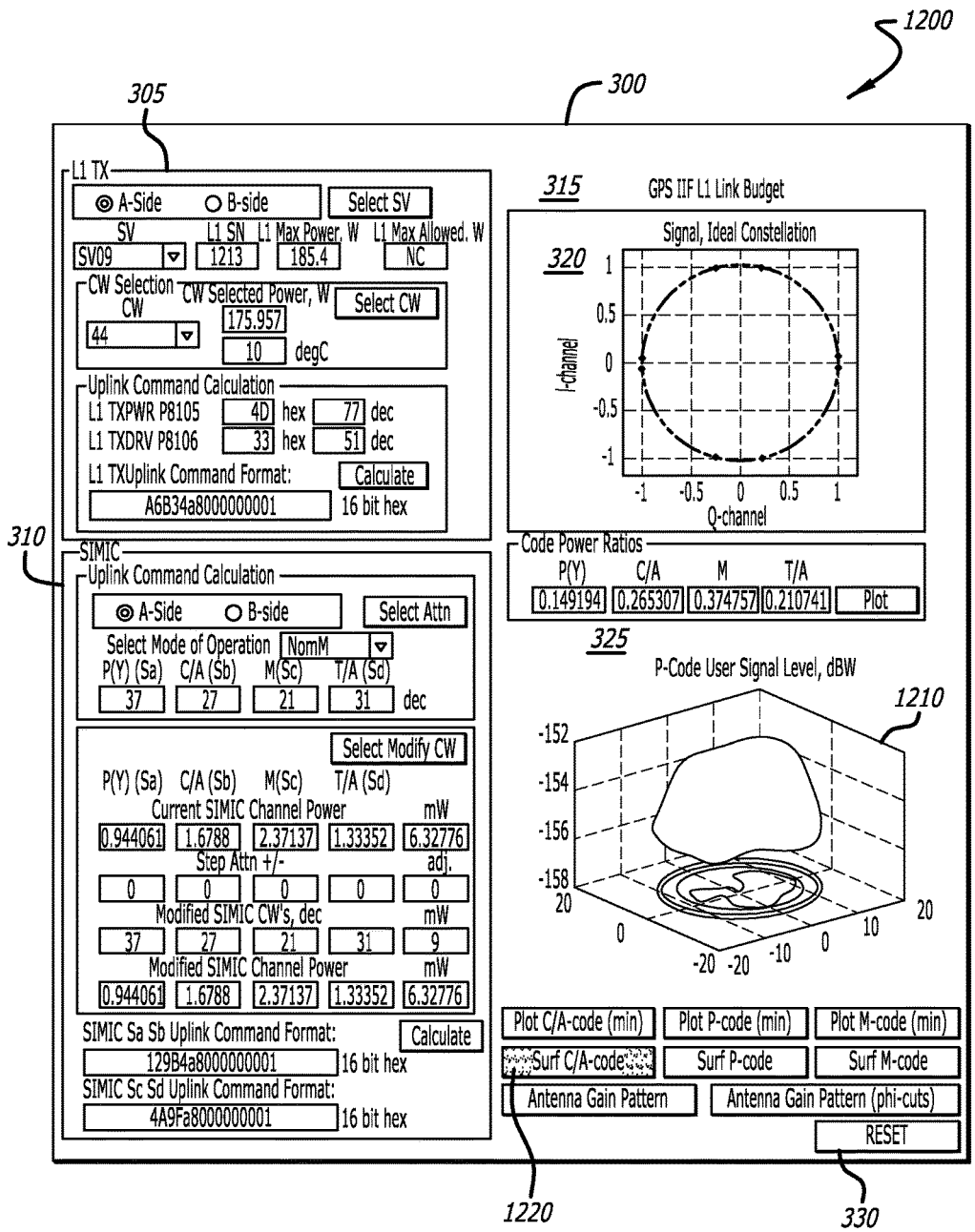
FIG. 12 is a diagram illustrating a plot showing the surface antenna pattern for the C/A code on the plotting block of the GUI of FIG. 3, in accordance with at least one embodiment of the present disclosure.

FIG. 12 is a diagram 1200 illustrating a plot 1210 showing the surface antenna pattern for the C/A code on the plotting block 315 of the GUI 300 of FIG. 3, in accordance with at least one embodiment of the present disclosure. In particular, the diagram 1200 depicts the plot 1210 in the lower plotting block 325 of the plotting block 315 of the GUI 300 of FIG. 3. For the plot 1210, the phi-cut measured antenna angles in deg are on the x-axis and the y-axis, and the P-code user signal level in dBW is on the z-axis. When the user desires to plot the surface antenna pattern for the C/A-code on the lower plotting block 325 of the GUI 300, the user depresses the "Surf C/A-code" button 1220 button of the lower plotting block 325 and the plot 1210 will be displayed in the lower plotting block 325 on the GUI 300.

In order to optimize the codes for a specific geographical region, the GUI 300 (refer to FIG. 3) can display 3D antenna gain plots for each of the codes (i.e. P(Y), C/A, M, and T/A) for visualization.

Figure 13:
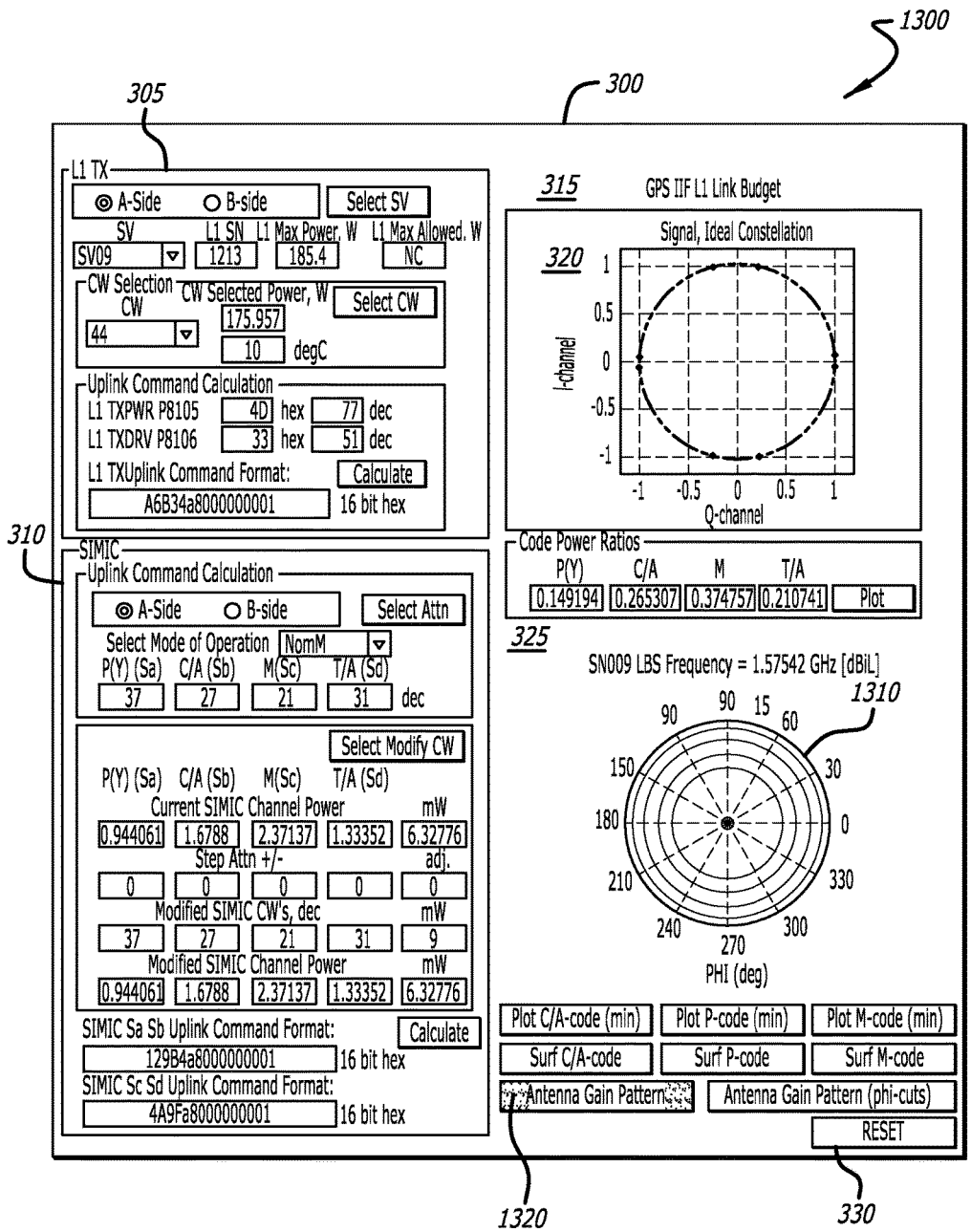
FIG. 13 is a diagram showing a plot showing the contour L1 antenna pattern for each of the codes on the plotting block of the GUI of FIG. 3, in accordance with at least one embodiment of the present disclosure.

FIG. 13 is a diagram 1300 showing a plot 1310 showing the contour L1 antenna pattern for each of the codes on the plotting block 315 of the GUI 300 of FIG. 3, in accordance with at least one embodiment of the present disclosure. In particular, the diagram 1300 depicts the plot 1310 in the lower plotting block 325 of the plotting block 315 of the GUI 300 of FIG. 3. For the plot 1310, the phi-cut measured antenna angles in deg are around the perimeter, and the antenna contours are in directivity (dBi). When the user desires to plot the contour L1 antenna pattern for each of the codes on the lower plotting block 325 of the GUI 300, the user depresses the "Antenna Gain Pattern" button 1320 button of the lower plotting block 325 and the plot 1310 will be displayed in the lower plotting block 325 on the GUI 300.

Figure 14:
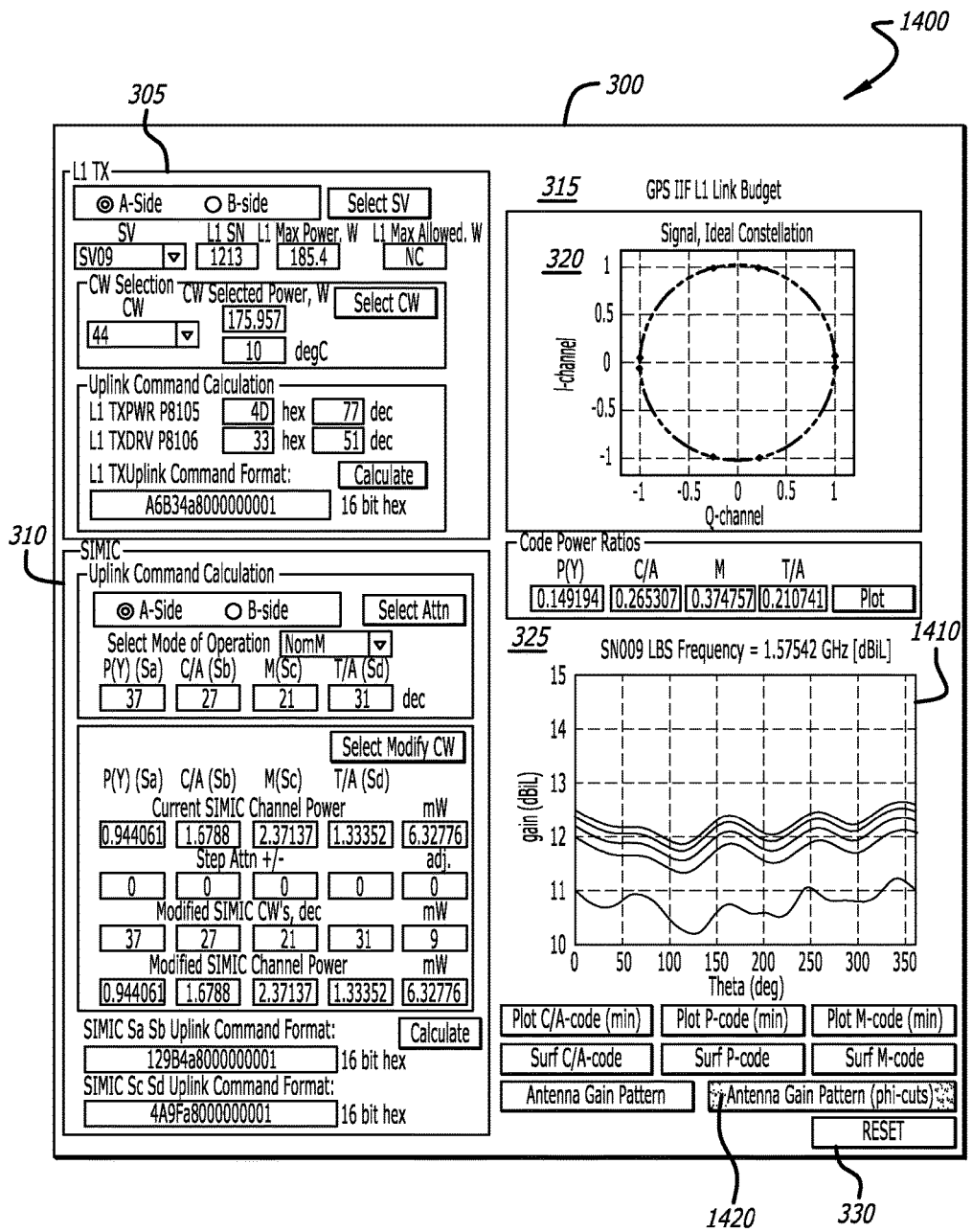
FIG. 14 is a diagram depicting a plot showing the phi-cut minimum L1 antenna gain pattern for each of the codes on the plotting block of the GUI of FIG. 3, in accordance with at least one embodiment of the present disclosure.

FIG. 14 is a diagram 1400 depicting a plot 1410 showing the phi-cut minimum L1 antenna gain pattern for each of the codes on the plotting block 315 of the GUI 300 of FIG. 3, in accordance with at least one embodiment of the present disclosure. In particular, the diagram 1400 depicts the plot 1410 in the lower plotting block 325 of the plotting block 315 of the GUI 300 of FIG. 3. For the plot 1410, the angle theta in deg is on the x-axis and the antenna gain in directivity (dBi) is on the y-axis. When the user desires to plot the phi-cut minimum L1 antenna gain pattern for each of the codes on the lower plotting block 325 of the GUI 300, the user depresses the "Antenna Gain Pattern (phi-cuts)" button 1420 button of the lower plotting block 325 and the plot 1410 will be displayed in the lower plotting block 325 on the GUI 300.

Figure 15:
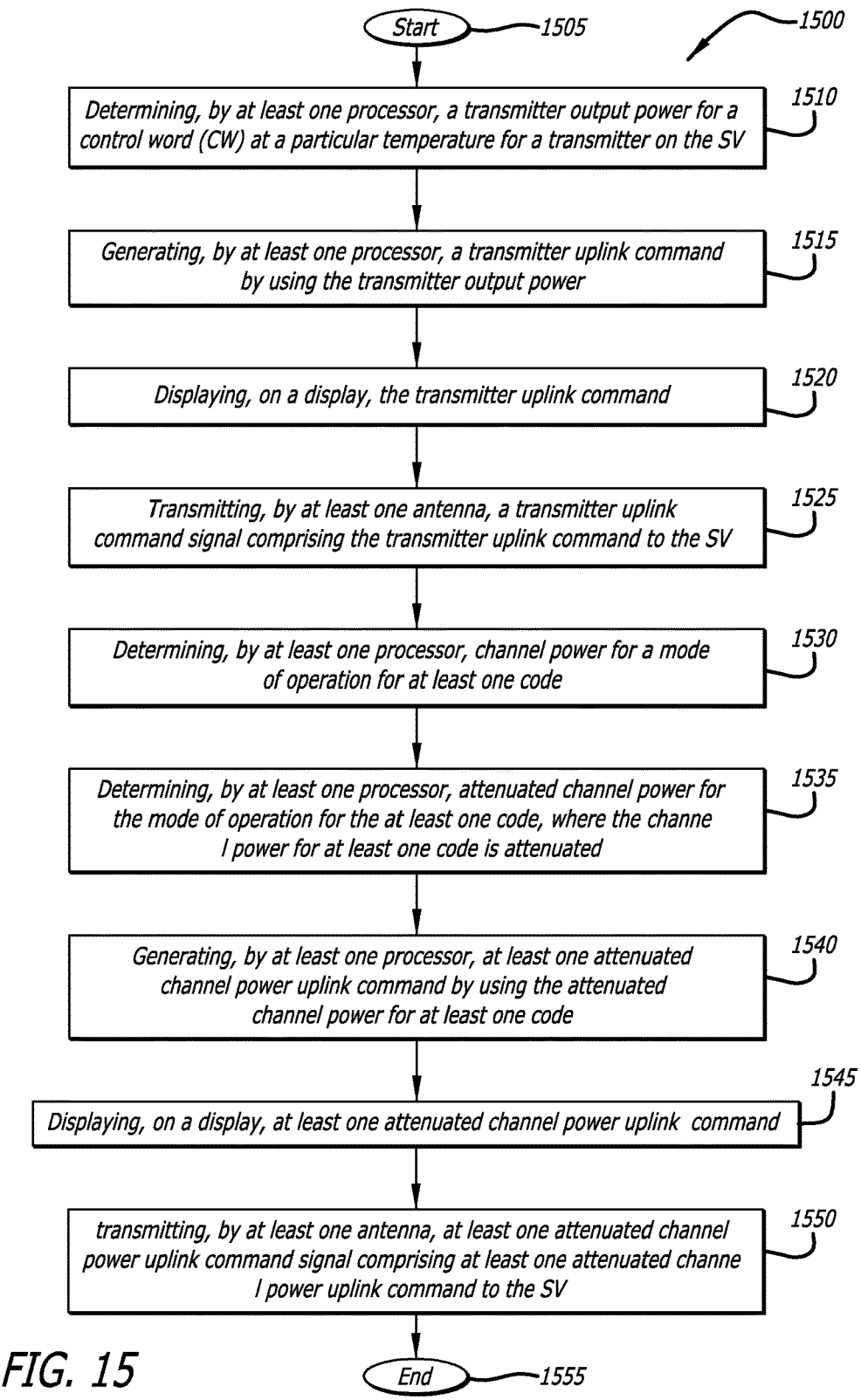
FIG. 15 is a flow chart depicting the disclosed method for commanding a space vehicle (SV), in accordance with at least one embodiment of the present disclosure.

FIG. 15 is a flow chart depicting the disclosed method 1500 for commanding a space vehicle (SV), in accordance with at least one embodiment of the present disclosure. At the start 1505 of the method 1500, at least one processor determines a transmitter output power for a control word (CW) at a particular temperature for a transmitter on the SV 1510. Then, at least one processor generates a transmitter uplink command by using the transmitter output power 1515. A display displays the transmitter uplink command 1520. At least one antenna transmits a transmitter uplink command signal comprising the transmitter uplink command to the SV 1525.

At least one processor determines channel power for a mode of operation for at least one code 1530. Then, at least one processor determines attenuated channel power for the mode of operation for at least one code, where the channel power for at least one code is attenuate 1535. At least one processor generates at least one attenuated channel power uplink command by using the attenuated channel power for at least one code 1540. A display displays at least one attenuated channel power uplink command 1545. Then, at least one antenna transmits at least one attenuated channel power uplink command signal comprising at least one attenuated channel power uplink command to the SV 1550. Then, the method 1500 ends 1555.

Figure 16:
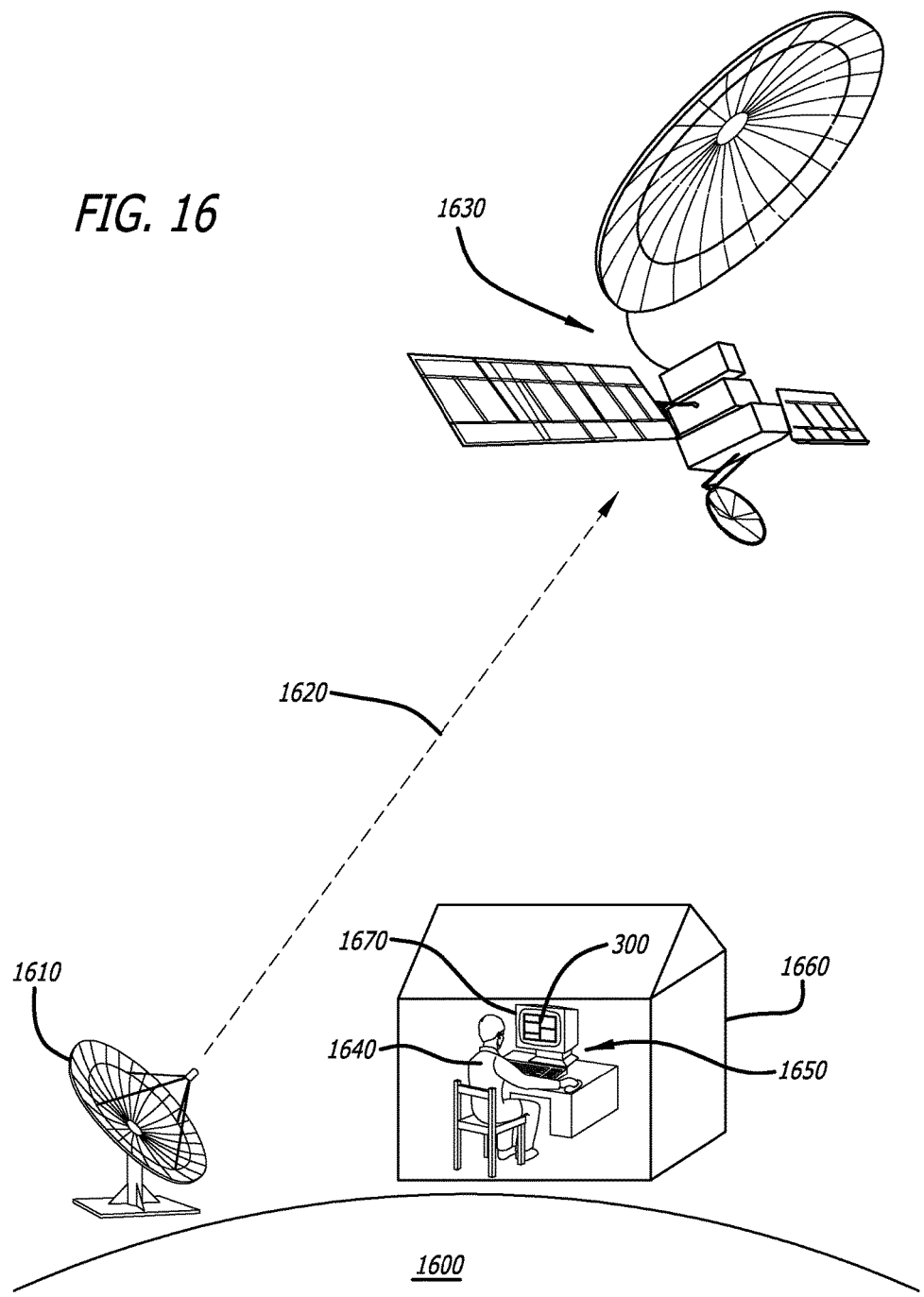
FIG. 16 is a diagram illustrating an antenna transmitting a transmitter uplink command signal(s) to a SV, in accordance with at least one embodiment of the present disclosure.

FIG. 16 is a diagram 1600 illustrating an antenna 1610 transmitting a transmitter uplink command signal(s) 1620 to a SV 1630, in accordance with at least one embodiment of the present disclosure. In this figure, a user (e.g., a ground station operator) 1640 is shown to be working at a computer 1650 at a satellite ground station 1660. The computer 1650 comprises at least one processor (not shown) and a display 1670. The display 1670 displays the GUI 300 (refer to FIG. 3) to the user 1640. The user 1640 uses the GUI 300 to cause at least one processor in the computer 1650 to generate a customized uplink command(s) (e.g., a transmitter uplink command 470 (refer to FIG. 4) and/or an attenuated channel power uplink command(s) 560 (refer to FIG. 5)). After the customized uplink command(s) is generated, the antenna 1610 will transmit to the SV 1630 a corresponding uplink command signal(s) 1620 comprising the customized uplink command(s) (e.g., a transmitter uplink command signal comprising a transmitter uplink command 470 (refer to FIG. 4) and/or an attenuated channel power uplink command signal(s) comprising an attenuated channel power uplink command(s) 560 (refer to FIG. 5)).

Figure 17:
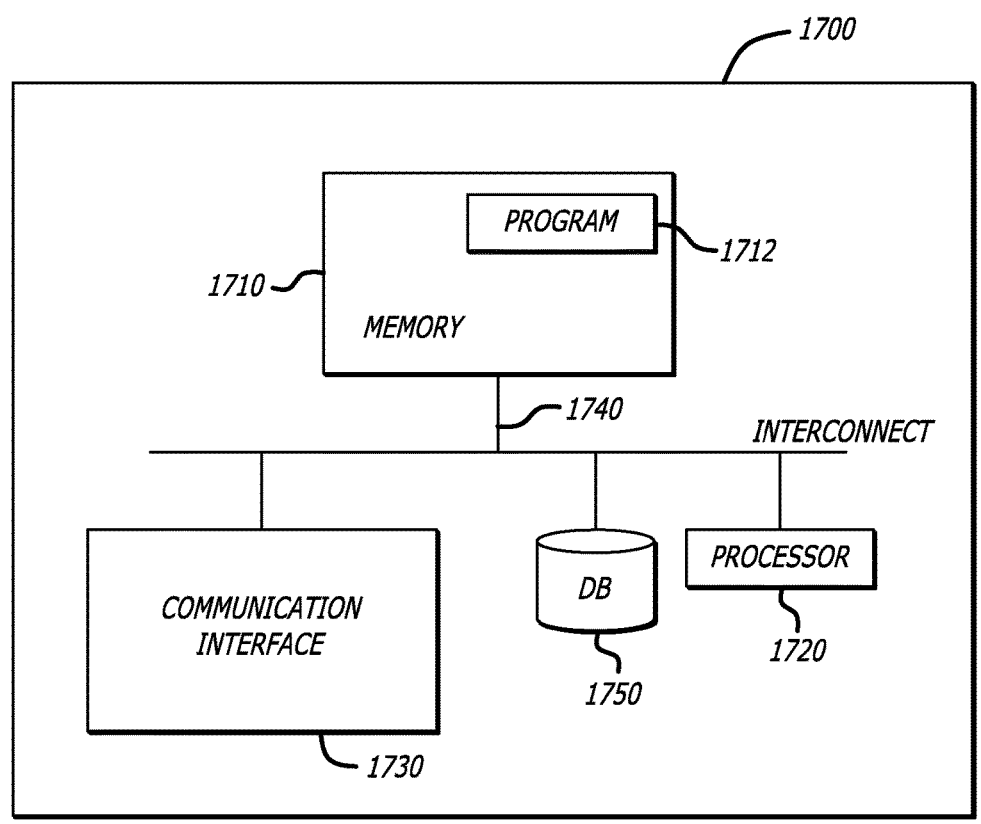
FIG. 17 is a block diagram of components of a computing apparatus or system in which various embodiments may be implemented or that may be utilized to execute embodiments.

FIG. 17 is a block diagram 1700 of components of a computing apparatus or system in which various embodiments may be implemented or that may be utilized to execute embodiments. FIG. 17 generally illustrates components of a computing device 1700 (e.g., the computer 1650 of FIG. 16) that may be utilized to execute embodiments and that includes a memory 1710, a program (e.g., satellite link budget GUI application instructions) 1712, a processor or controller 1720 to execute the program 1712, a database 1750 for storing data (e.g., for storing the CWs 435 of FIG. 4) a network interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network that may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 executes program instructions 1712 within memory 1710 and/or embodied on the carrier to implement method embodiments. Further, embodiments may reside and/or execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve a satellite link budget GUI application or algorithm (which may be run on at least one server (e.g., computer 1650 of FIG. 16)) that is a stand alone application, which may contain one or more programs, or that is part of another system or program.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for commanding a space vehicle (SV), the method comprising:
    determining, by at least one processor, a transmitter output power for a control word (CW) at a particular temperature for a transmitter on the SV,
    wherein the particular temperature of the transmitter is a temperature prediction based on on-orbit operations;
    generating, by the at least one processor, a transmitter uplink command by using the transmitter output power;
    transmitting, by at least one antenna, a transmitter uplink command signal comprising the transmitter uplink command to the SV; and
    adjusting the transmitter to provide an output power according to the transmitter uplink command.

2. The method of claim 1, wherein the transmitter and the CW are selected by a user via a user graphical interface (GUI) displayed on a display.

3. The method of claim 1, wherein the method further comprises displaying, on a display, the transmitter uplink command.

4. The method of claim 1, wherein the transmitter uplink command is a hexadecimal number.

5. The method of claim 1, wherein the method further comprises:
    determining, by the at least one processor, channel power for a mode of operation for at least one code;
    determining, by the at least one processor, attenuated channel power for the mode of operation for the at least one code, wherein the channel power for the at least one code is attenuated,
    generating, by the at least one processor, at least one attenuated channel power uplink command by using the attenuated channel power for the at least one code.

6. The method of claim 5, wherein the mode of operation and the attenuation for the channel power for the at least one code are selected by a user via a user graphical interface (GUI) displayed on a display.

7. The method of claim 6, wherein the attenuation is selected in steps ranging from approximately 1 to 127.

8. The method of claim 5, wherein the method further comprises displaying, on a display, the at least one attenuated channel power uplink command.

9. The method of claim 5, wherein each of the at least one attenuated channel power uplink command is a hexadecimal number.

10. The method of claim 5, wherein the method further comprises transmitting, by the at least one antenna, at least one attenuated channel power uplink command signal comprising the at least one attenuated channel power uplink command to the SV.

11. The method of claim 5, wherein the method further comprises displaying, on a display, a constellation plot comprising code power ratios for the at least one code.

12. The method of claim 5, wherein the method further comprises displaying, on a display, a plot comprising a minimum link performance for each of the at least one code.

13. The method of claim 5, wherein the method further comprises displaying, on a display, a plot comprising a surface antenna pattern for each of the at least one code.

14. The method of claim 5, wherein the method further comprises displaying, on a display, a plot comprising a contour antenna gain pattern for each of the at least one code.

15. The method of claim 5, wherein the method further comprises displaying, on a display, a plot comprising a phi-cut antenna gain pattern for each of the at least one code.

16. The method of claim 1, wherein the SV is a global positioning system (GPS) satellite.

17. A system for commanding a space vehicle (SV), the system comprising:
    at least one processor to determine a transmitter output power for a control word (CW) at a particular temperature for a transmitter on the SV, wherein the particular temperature of the transmitter is a temperature prediction based on on-orbit operations, and to generate a transmitter uplink command by using the transmitter output power; and
    at least one antenna to transmit a transmitter uplink command signal comprising the transmitter uplink command to the SV,
    wherein the transmitter is adjusted to provide an output power according to the transmitter uplink command.

18. The system of claim 17, wherein the system further comprises a display to display the transmitter uplink command.

19. The system of claim 17, wherein at least one processor is further to determine channel power for a mode of operation for at least one code; to determine attenuated channel power for the mode of operation for the at least one code, wherein the channel power for the at least one code is attenuated; and to generate at least one attenuated channel power uplink command by using the attenuated channel power for the at least one code.

20. The system of claim 19, wherein the system further comprises a display to display the at least one attenuated channel power uplink command.

21. The system of claim 19, wherein the at least one antenna is further to transmit at least one attenuated channel power uplink command signal comprising the at least one attenuated channel power uplink command to the SV.

22. The system of claim 17, wherein the SV is a global positioning system (GPS) satellite.

23. The system of claim 22, wherein the transmitter is an L-band transmitter.

* * * * *